US008885975B2

(12) United States Patent
Yu et al.

(10) Patent No.: US 8,885,975 B2
(45) Date of Patent: Nov. 11, 2014

(54) METHOD AND APPARATUS FOR ITERATIVE RECONSTRUCTION

(75) Inventors: Zhou Yu, Waukesha, WI (US); Bruno Kristiaan Bernard De Man, Niskayuna, NY (US); Jean-Baptiste Thibault, Waukesha, WI (US); Debashish Pal, Waukesha, WI (US); Lin Fu, Niskayuna, NY (US); Charles A. Bouman, West Lafayette, IN (US); Ken Sauer, South Ben, IN (US); Sathish Ramani, Ann Arbor, MI (US); Jeffrey A. Fessler, Ann Arbor, MI (US); Somesh Srivastava, Waukesha, WI (US)

(73) Assignees: General Electric Company, Schenectady, NY (US); The Regents of the University of Michigan, Ann Arbor, MI (US); Purdue Research Foundation, West Lafayette, IN (US); University of Notre Dame du Lac, Notre Dame, IN (US)

( * ) Notice: Subject to any disclaimer, the term of this patent is extended or adjusted under 35 U.S.C. 154(b) by 176 days.

(21) Appl. No.: 13/531,082

(22) Filed: Jun. 22, 2012

(65) Prior Publication Data

US 2013/0343672 A1  Dec. 26, 2013

(51) Int. Cl.
*G06K 9/36* (2006.01)
*G06K 9/00* (2006.01)
*G06T 11/00* (2006.01)

(52) U.S. Cl.
CPC ............. *G06T 11/003* (2013.01); *G06T 11/006* (2013.01); *G06T 2211/424* (2013.01)
USPC .......................................... 382/276; 382/131

(58) Field of Classification Search
CPC ............ G06T 11/003; G06T 2211/424; G06T 11/006
USPC ................................................... 382/131, 276
See application file for complete search history.

(56) References Cited

U.S. PATENT DOCUMENTS 8,310,233 B2 * 11/2012 Trzasko et al. ................ 324/309

* cited by examiner

*Primary Examiner* — Kanjibhai Patel
(74) *Attorney, Agent, or Firm* — Dean D. Small; The Small Patent Law Group

(57) ABSTRACT

A method is provided for reconstructing an image of an object that includes image elements. The method includes accessing measurement data associated with the image elements, introducing an auxiliary variable to transform an original problem of reconstructing the image to a constrained optimization problem, and solving the constrained optimization problem using a method of multipliers to create a sequence of sub-problems and solve the sequence of sub-problems. Solving the sequence of sub-problems includes reconstructing the image by optimizing a first objective function. The first objective function is optimized by iteratively solving a nested sequence of approximate optimization problems. An inner loop iteratively optimizes a second objective function approximating the first objective function. An outer loop utilizes the solution of the second objective function to optimize the first objective function.

22 Claims, 4 Drawing Sheets

METHOD AND APPARATUS FOR ITERATIVE RECONSTRUCTION

BACKGROUND OF THE INVENTION

The subject matter disclosed herein relates generally to imaging systems, and more particularly, to a method and apparatus for reconstructing an image using iterative techniques.

Traditionally, images have been reconstructed from Computed Tomography (CT) data using direct reconstruction algorithms such as filtered back projection (FBP) or convolution back projection (CBP). Recently, model based iterative reconstruction (MBIR) algorithms have become commercially available for reconstructing CT images. One advantage of MBIR algorithms is that MBIR algorithms can more accurately model the measurements obtained from CT systems. This is particularly true for helical CT systems with multi-slice detectors because helical CT systems produce projection measurements that pass obliquely through the two-dimensional (2D) reconstructed image planes, and the acquired data is inherently noisy. By more accurately modeling these projections, MBIR algorithms can produce reconstructions with higher quality (e.g., resolution), lower noise, and fewer artifacts. As a result, MBIR algorithms may be used as a tool to significantly reduce the dose in CT scans while maintaining the diagnostic image quality.

However, a major challenge of MBIR is the computation time and computational resources required to complete a reconstruction. MBIR algorithms typically reconstruct an image by first forming an objective function that incorporates an accurate system model, statistical noise model, and prior model. With the objective function in hand, the image is then reconstructed by computing an estimate that minimizes the objective function, which is typically performed using an iterative optimization algorithm. Examples of some of such iterative optimization algorithms include iterative coordinate descent (ICD), variations of expectation maximization (EM), conjugate gradients (CG), and ordered subsets (OS). However, because of the complexity of the MBIR objective function and the associated iterative solution, some iterative algorithms may require a relatively high number of iterations to achieve the final estimate. As a result, known iterative algorithms that solve the MBIR objective function may require a relatively large amount of time to reconstruct an image.

BRIEF DESCRIPTION OF THE INVENTION

In one embodiment, a method is provided for reconstructing an image of an object that includes image elements. The method includes accessing measurement data associated with the image elements, introducing an auxiliary variable to transform an original problem of reconstructing the image to a constrained optimization problem, and solving the constrained optimization problem using a method of multipliers to create a sequence of sub-problems and solve the sequence of sub-problems. Solving the sequence of sub-problems includes reconstructing the image by optimizing a first objective function. The first objective function is optimized by iteratively solving a nested sequence of approximate optimization problems. An inner loop iteratively optimizes a second objective function approximating the first objective function. An outer loop utilizes the solution of the second objective function to optimize the first objective function.

In another embodiment, a non-transitory computer readable medium is provided. The non-transitory computer readable medium is programmed to instruct a computer to access measurement data associated with image elements, and create a sequence of sub-problems from an original problem of reconstructing an image of an object. The sub-problems include a reconstruction of the image, an auxiliary variable, and a transform of a Lagrangian multiplier. The computer is also instructed to update the reconstruction of the image and the auxiliary variable. The computer is also instructed to update the transform of the Lagrangian multiplier using the updated reconstruction of the image and the updated auxiliary variable. The computer is also instructed to iteratively update the reconstruction of the image using the updated auxiliary variable and the updated transform of the Lagrangian multiplier.

In another embodiment, an imaging system is provided. The imaging system includes a detector array and a computer coupled to the detector array. The computer is configured to access measurement data associated with image elements, introduce an auxiliary variable to transform an original problem of reconstructing an image of an object to a constrained optimization problem, and solve the constrained optimization problem using a method of multipliers to create a sequence of sub-problems and solve the sequence of sub-problems. Solving the sequence of sub-problems includes reconstructing the image by optimizing a first objective function. The first objective function is optimized by iteratively solving a nested sequence of approximate optimization problems. An inner loop iteratively optimizes a second objective function approximating the first objective function. An outer loop utilizes the solution of the second objective function to optimize the first objective function.

DETAILED DESCRIPTION OF THE INVENTION

Figure 1:
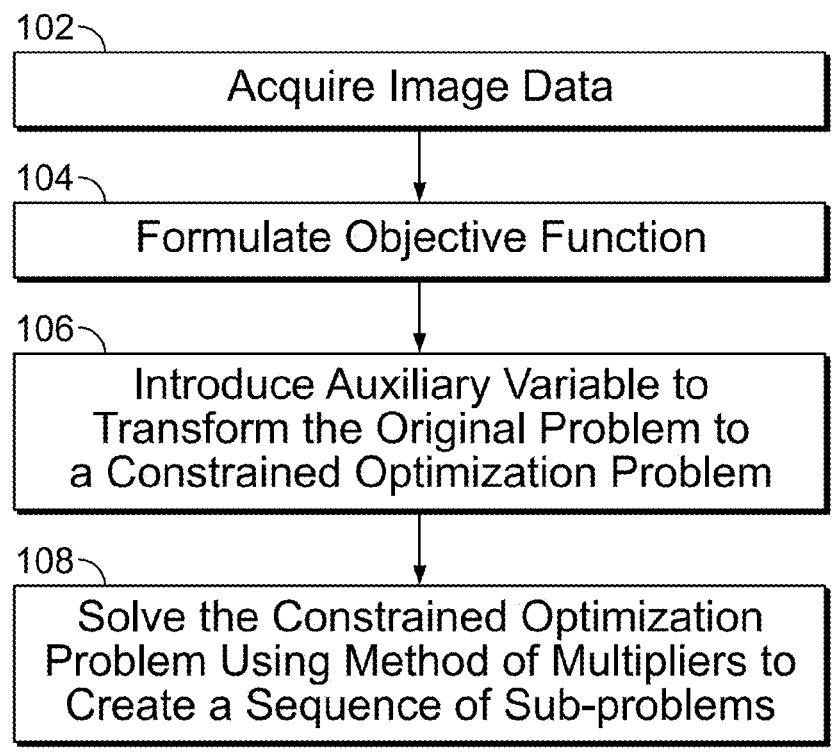
FIG. 1 is a flowchart of an exemplary method for reconstructing an image of an object in accordance with various embodiments.

The foregoing summary, as well as the following detailed description of various embodiments, will be better understood when read in conjunction with the appended drawings. To the extent that the figures illustrate diagrams of the functional blocks of the various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings.

Described herein are various embodiments for reconstructing an image using an exemplary algorithm that combines a variable splitting technique and an implicit preconditioner method. The image is composed of a plurality of image elements. For the purposes disclosed herein, the term "image element" shall refer to an element of an object within the image space array. For example, an image element may include an image pixel or picture element that can correspond to a single voxel or volume element in a three-dimensional (3D) reconstruction. The image is reconstructed by optimizing an objective function. As used herein, an objective function, or cost function, generally includes a model of the imaging system used to acquire the imaging data, of the noise associated with the imaging system, and of the properties of the image to be reconstructed. In the following, the terms 'optimize', 'minimize', and 'maximize' are interchangeable. In the following, the terms 'objective function' and 'cost function' are interchangeable.

Various embodiments provide a relatively fast convergent parallel model based iterative reconstruction (MBIR) algorithm that uses a combination of variable splitting technique and an implicit preconditioner method to speed up the convergence of simultaneous algorithms for MBIR. The variable splitting technique creates a sequence of sub-problems, where in each sub-problem the Hessian matrix may be approximately shift-invariant. Preconditioners may be used to accelerate the convergence of the sub-problem. Specifically, the implicit preconditioner method is used to create an approximation to the sub-problem in each of a plurality of outer loop iterations. (Instead of approximating the inverse of the Hessian directly, the implicit preconditioner method works by iteratively solving the equation that relates image and measurement data without explicitly calculating the inverse of the Hessian.) The approximated sub-problem is then solved by inner loop iterations that have relatively low computational cost. In other words, the inner loop calculation improves the convergence speed of the outer loop iteration. More specifically, the optimization algorithm for the MBIR objective function is composed of nested iteration loops, wherein the inner loop is formulated to iteratively optimize an approximate objective function defined to approximate the cost function iteratively optimized by the outer loop; and the outer loop iterations optimize the original MBIR cost function using the solution generated using the inner loop. At least one technical effect of various embodiments is that the outer and inner loop calculations converge to the solution of the original cost function in fewer iterations than conventional simultaneous algorithms. For example, various embodiments described herein may converge to acceptable image quality in five to ten iterations as compared to 50 or 100 iterations required by conventional algorithms published in the art.

FIG. 1 is a flowchart of an exemplary method 100 for reconstructing an image of an object. At 102, the method includes acquiring projection, or measurement, data using an exemplary imaging system. At 104, an objective function is formulated. In one embodiment, the objective function is formulated at 104 based on the measurement data and the prior knowledge of the image representing the scanned object. For example, let x denote the image and y denote the measurement data, wherein both x and y represent vectors. In operation, the method 100 is configured to reconstruct the image by computing the maximum a posteriori (MAP) estimate given by:

$$\dot{x} = \arg\min f(x) \quad \text{Equation 1}$$

$$f(x) = \{J(x,y) + \Phi(x)\} \quad \text{Equation 2}$$

where $f(x)$ is the objective function, in which, $J(x, y)$ is the data mismatch term that penalizes the inconsistency between the image and the measurement; and $\Phi(x)$ is the regularization function that penalizes differences between adjacent elements in the image.

In one embodiment, $J(x, y)$ has a quadratic form as follows:

$$J(x,y) = \|Ax - y\|_W^2 \quad \text{Equation 3}$$

where A is the forward system matrix; and W is a diagonal weighting matrix. The $i^{th}$ diagonal entry of the matrix W, denoted by $w_i$, is inversely proportional to an estimate of the variance in the measurement $y_i$. But, other forms of data mismatch terms may be used with the method 100, such as, but not limited to, Poisson log likelihood function and/or the like. In some cases, in addition to the objective function, the optimization problem could have additional equality or inequality constraints on the variables. For example, non-negativity constraints are commonly applied to image pixels.

The method 100 includes transforming the original problem (i.e., Equation 1) to a sequence of sub-problems. The sub-problems are created in two steps. First, at 106, a set of auxiliary variables is introduced to add additional terms in the objective functions and additional constraints to the optimization problem. The introduction at 106 of the set of auxiliary variables transforms the original problem to a constrained optimization problem. The constrained optimization problem is then solved, at 108, using a method of multipliers. The method of multipliers turns the constrained optimization problem into a sequence of sub-problems (e.g., the steps 110-112 described below), where each sub-problem is relatively easier to solve than the original problem. For example, in Equation 3, the Hessian matrix of the data mismatch term is given by $A^t W A$. Due to the relatively large dynamic range in W, it may be difficult to design a preconditioner P that that approximates $(A^t W A)^{-1}$ relatively well. On the other hand, the matrix $A^t A$ for tomographic reconstruction problems can be well approximated by shift-invariant image space operators, which are relatively easy to invert. Therefore, the method 100 is used to solve the original problem through a sequence of sub-problems, while in the sub-problem it is only needed to invert the $A^t A$ matrix.

In one embodiment, the constrained optimization problem is created at 106 by first introducing the auxiliary variable u=Ax into the data mismatch term J(x, y), which turns the unconstrained optimization problem of Equation 2 into a constrained optimization problem. The auxiliary variable u corresponds to the forward projection of the image. As an example, if J(x, y) is given by Equation 3, the original problem is then transformed to the following constrained optimization problem:

$$x = \arg\min \frac{1}{2} \|u - y\|_W^2 + \Phi(x) \quad \text{Equation 4}$$

subject to $u = Ax$ \quad Equation 5

As described above, at 108, the constrained optimization problem is solved using a method of multipliers. In other words, the method of multipliers turns the constrained optimization problem into a sequence of sub-problems, and then solves the sequence of sub-problems iteratively. Accordingly, solving the constrained optimization problem using a method of multipliers includes solving the original problem by solving a the sequence of sub-problems. The constrained optimization problem can be solved using various methods. In the exemplary embodiment, solving at 108 the constrained optimization problem includes solving the constrained optimization problem using an augmented Lagrangian (AL) method. Other methods may be used in addition or alternative to the AL method.

Figure 2:
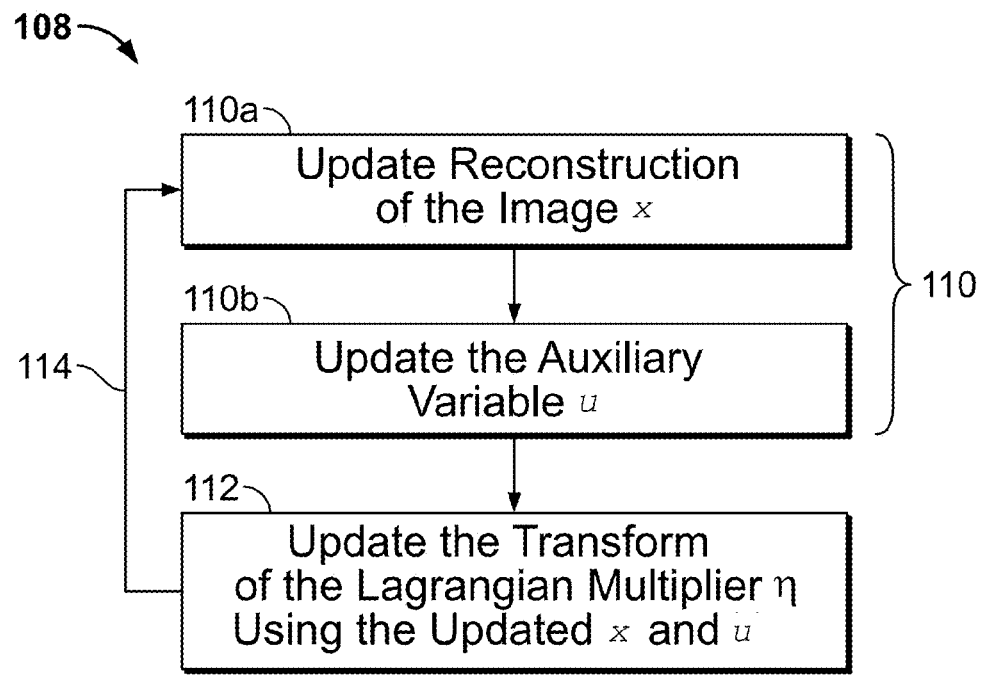
FIG. 2 is another flowchart illustrating an exemplary method of performing a solving step of the method shown in FIG. 1 in accordance with various embodiments.

FIG. 2 is another flowchart illustrating an exemplary method of solving at 108 the constrained optimization problem using a method of multipliers. The sequence of sub-problems created at 108 may include, for example, the reconstruction of the image x at 110a, the auxiliary variable u (which corresponds to the forward projection of x) at 110b, and a transform of the Lagrangian multiplier η at 112. The reconstruction of the image x may be initialized with filtered back projection (FBP) reconstruction. The auxiliary variable u may be initialized by forward projecting the image x, while η may be initialized as zeros. The method of solving at 108 includes updating the sub-problems of the variables x, u, and η alternatively. The updates of the sinogram variables η and u have closed form solutions, while the update of x is solved iteratively.

For example, at 110, the method of solving at 108 includes updating the reconstruction of the image x and the auxiliary variable u using the initial value of η. In one embodiment, the reconstruction of the image x and the auxiliary variable u are updated at 110 alternatively. In the exemplary embodiment, the reconstruction of the image x is updated at 110a before the auxiliary variable u is updated at 110b. But, the reconstruction of the image x and the auxiliary variable u may be updated at 110 in any order. For example, the auxiliary variable u may be updated before the reconstruction of the image x is updated. Examples of updating the reconstruction of the image x at 110a and updating the auxiliary variable u at 110b include, but are not limited to, using the Equations 13 and 12 (described below), respectively.

The transform of the Lagrangian multiplier η is then updated, at 112, using the updated reconstruction of the image x and the updated auxiliary variable u. An example of updating the transform of the Lagrangian multiplier η at 112 includes, but is not limited to, using Equation 9 (described below). At 114, the method of solving at 108 includes iteratively updating the reconstruction of the image x using the auxiliary variable u and the updated transform of the Lagrangian multiplier η. The reconstruction of the image x may be iteratively updated at 114 until the objective function $f(x)$ is reduced to a predetermined level and/or minimized.

One exemplary implementation of the method of solving at 108 the constrained optimization problem using the AL method of multipliers will now be described. The AL function is given by:

$$L(u, x, \gamma) = f(x, u) + \gamma^t(u - Ax) + \frac{\mu}{2}\|u - Ax\|_\Lambda^2 \qquad \text{Equation 6}$$

Let $\eta = -1/\mu \Lambda^{-1}\gamma$, we can simplify the AL function into the following form:

$$L(u, x, \eta) = f(x, u) + \frac{\mu}{2}\|u - Ax - \eta\|_\Lambda^2 \qquad \text{Equation 7}$$

Each iteration of the AL method is composed of two steps. First, in the optimization step (e.g., the step 110 of FIG. 2), the update of x (e.g., the step 110a of FIG. 2) and the update of u (e.g., the step 110b of FIG. 2) are computed by jointly optimizing the AL function given the current value of η.

$$(x^{(j+1)}, u^{(j+1)}) = \underset{x,u}{\operatorname{argmin}} L(u, x, \eta^{(j)}) \qquad \text{Equation 8}$$

where j denotes iteration index.

Second, η is updated (e.g., the step 112 of FIG. 2) with a closed form update equation:

$$\eta^{(j+1)} = \eta^{(j)} - (u^{(j+1)} - Ax^{(j+1)}) \qquad \text{Equation 9}$$

In one embodiment, the joint optimization problem is solved by updating x and u alternatively using:

$$x^{(j+1)} = \underset{x}{\operatorname{argmin}} L(x, u^{(j)}, \eta^{(j)}) \qquad \text{Equation 10}$$

$$u^{(j+1)} = \underset{u}{\operatorname{argmin}} L(x^{(j+1)}, u, \eta^{(j)}) \qquad \text{Equation 11}$$

The optimization problem with respect to u has a simple closed form solution given by:

$$u^{(j+1)} = (W + \mu\Lambda)^{-1}(Wy + \mu\Lambda(Ax^{(j+1)} + \eta^{(j)})) \qquad \text{Equation 12}$$

The remaining problem to solve is the update of x (e.g., the step 114 of FIG. 2). Given the AL function, we can rewrite Equation 10 as:

$$x^{(j+1)} = \underset{x}{\operatorname{argmin}} \frac{\mu}{2}\|Ax - u^{(j+1)} + \eta^{(j+1)}\|_\Lambda^2 + \Phi(x) \qquad \text{Equation 13}$$

Figure 3:
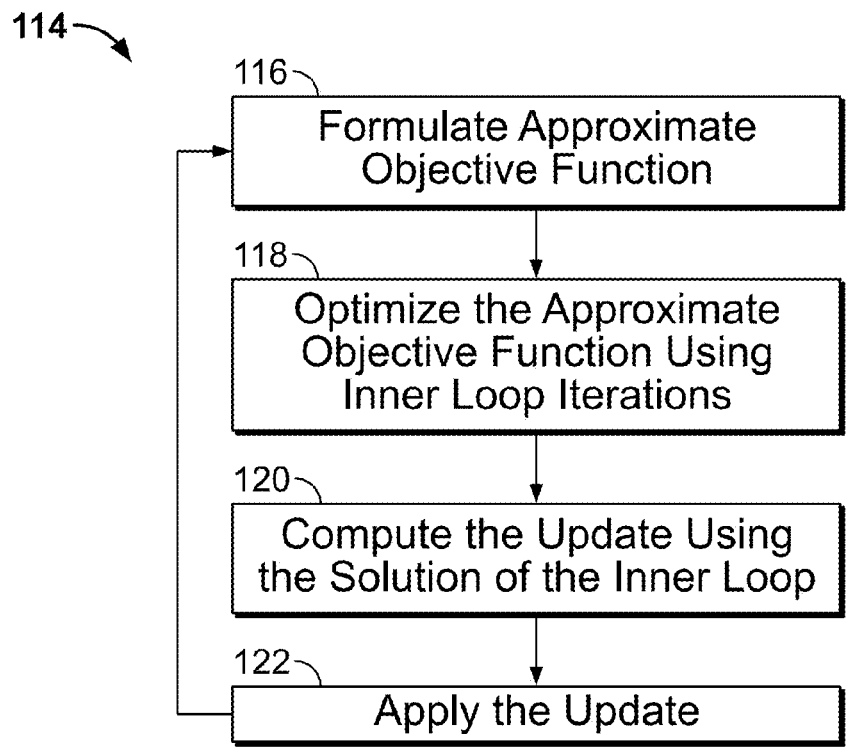
FIG. 3 is another flowchart illustrating an exemplary method of performing an iterative updating step of the method shown in FIG. 2.

FIG. 3 is another flowchart illustrating an exemplary method of iteratively updating at 114 the reconstruction of the image x using the updated forward projection of the image u and the updated transform of the Lagrangian multiplier η. Generally, an implicit preconditioner method is used to create an approximation to the sub-problem in each of a plurality of outer loop iterations. In other words, the method 114 includes an outer loop that iteratively minimizes the original cost function. In each outer loop, an approximate cost function is first formulated. The approximate cost function is then optimized using inner loop iterations. Specifically, the method 114 includes nested iteration loops, wherein the inner loop is formulated to iteratively optimize an approximate objective function defined to approximate the cost function iteratively optimized by the outer loop. The result of the inner loop is used as preconditioned gradient direction to update the image. In other words, the outer loop iterations optimize the original cost function using the solution generated using the inner loop.

For example, the method 114 includes various steps 116-120 that define the outer loop. Specifically, at 116, the method 114 includes formulating an approximate objective function. At 118, the approximate objective function is optimized using inner loop iterations shown in FIG. 4. The step 118 may be referred to herein as the "inner loop". In the exemplary embodiment, the inner loop 118 of the algorithm is utilized to increase convergence speed of the algorithm, or to decrease computational complexity for fast implementation on computer hardware.

The inner loop 118 includes steps 124-132 (described below and illustrated in FIG. 4) that are used to solve the inner loop problem, which is then utilized to solve the problem in the outer loop. In other words, the solution to the approximate objective function minimized by the inner loop 118 is used by the outer loop during each iteration. Specifically, at 120, an update is computed using the solution of the inner loop 118. At 122, the image x is updated using the update computed at 120. In the exemplary embodiment, the steps 116-122 are performed iteratively until the cost function is reduced to a predetermined level and/or minimized.

Figure 4:
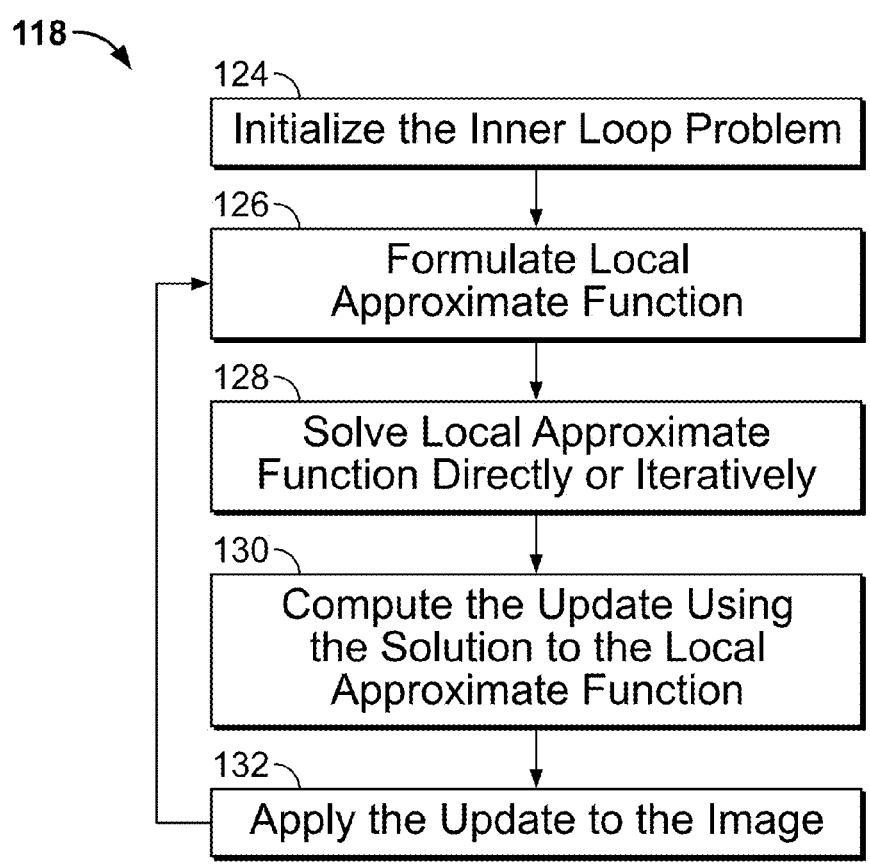
FIG. 4 is another flowchart illustrating an exemplary method of performing an optimizing step of the method shown in FIG. 3.

FIG. 4 is another flowchart illustrating an exemplary method of optimizing at 118 that approximate objective function of the outer loop. At 124, the inner loop is initialized. A local approximate function is formulated at 126. At 128, the local approximate function may be solved directly or iteratively. Solving at 128 the local approximate function may include computing an initial search direction. Moreover solving the local approximate function at 128 may further include computing an improved search direction. An optimal step size may be computed along the new improved search direction.

At 130, the method 118 further includes computing an update using the solution to the local approximate function solved at 128. In one embodiment, in addition to using the solution to the local approximate function, the update is computed at 130 using the improved search direction and/or the optimal step size.

At 132, the updates from steps 124-130 are applied to the image x. The output from the inner loop calculations are then used by the outer loop. Specifically, and referring again to FIG. 3, after the input has been received from the inner loop calculations, an optimized approximate objective function is computed at 118 by solving the inner loop problem. A new search direction may be computed for the outer loop. At 120, the update is computed using the solution of the inner loop 118. At 122, the image x is updated using the update computed at 120. The steps 116-122 may be performed iteratively until the cost function is reduced to a predetermined level and/or minimized.

One exemplary implementation of using the implicit preconditioner method to solve the sub-problem of iteratively updating at 114 the reconstruction of the image x will now be described. Unlike the update of u, the problem of solving the update of x (e.g., Equation 13) in general does not have a closed form solution, and therefore needs to be solved iteratively. The method does not require solving the optimization problems fully, therefore only a relatively small number of iterations (e.g., less than 20, equal to or less than 10, and/or the like) needs to be run. The sub-problem of updating x has similar structure to that of the original problem (i.e., Equation 1). The sub-problem of updating x is composed of a data mismatch term and a regularization term. The key difference is that in the data mismatch term, the data y is replaced by $u^{(j+1)} - \eta^{(j+1)}$, and the statistical weighting matrix W is replaced by $\Lambda$. For a non-uniform sampling geometry, $\Lambda$ may be chosen to make $A^t \Lambda A$ an approximately shift-invariant operator. $\Lambda$ may also be chosen to improve the conditioning of the $A^t \Lambda A$ matrix. In the exemplary embodiment, $\Lambda$ is chosen to be identity matrix to simplify the sub-problem of updating x. Therefore the Hessian of the data mismatch term is $A^t \Lambda A$ instead of $A^t W A$. Comparing to the original problem of Equation 1, the sub-problem of updating x may be easier to solve because: (1) $A^t \Lambda A$ does not depend on the data and therefore it is possible to precompute and store an approximation of $A^t \Lambda A$ or $(A^t \Lambda A)^{-1}$ for each scan protocol; and (2) $A^t \Lambda A$ can be approximately modeled as shift invariant and therefore it may be easier to design shift invariant preconditioners for the sub-problem of updating x.

In the sub-problem of updating x using Equation 13, if we choose $\Lambda$ to be the identity matrix, the eigenvalues of $A^t A$ associating with lower frequencies are relatively large, while the eigenvalues associating with higher frequencies are relatively small. Therefore, conventional algorithms such as conjugate gradients (CG) or gradient descent (GD) algorithms will suffer from slower convergence of higher frequencies. An explicitly defined preconditioner matrix P that approximates $(A^t \Lambda A)^{-1}$ can be applied. A relatively good preconditioner design may satisfy two goals: (1) P must be relatively easy to apply; and (2) P needs to be a relatively close approximation to $(A^t \Lambda A)^{-1}$. For example, such a preconditioner can be designed by approximating $A^t A$ as a shift invariant operator. Therefore, $P \approx (A^t \Lambda A)^{-1}$ can be computed using only a relatively few fast Fourier transforms (FFTs) and image scaling. Alternatively, one can select P to be an approximation to the inverse of the Hessian of the entire inner objective function in Equation 13.

One drawback of explicit preconditioner design is that it may be difficult to include the Hessian of the regularization term into the design, for example because the Hessian of the regularization term is not shift-invariant in general and is a function of x when $\Phi(x)$ is non-quadratic. One way to address such a problem is to split the regularization term and data mismatch term by introducing another set of auxiliary variables. In other words, an auxiliary variable v that corresponds to the image x or to a function of the image x is introduced to further split the regularization term in the sub-problem of updating x.

The method 114 solves the sub-problem of updating x using an implicitly defined preconditioner. An implicit preconditioner differs from an explicit preconditioner in both design and application. In the design of an implicit preconditioner, a matrix M that approximates the Hessian matrix H is found. In contrast, in the explicit preconditioner case, P is designed to directly to approximate $H^{-1}$. In general, approximating H instead of $H^{-1}$ has at least two benefits. For example, approximating H instead of $H^{-1}$ may provide the flexibility to use a more sophisticated and/or more accurate model of the Hessian. For example, M can be designed to be shift-varying, while for the same approximation, the explicit preconditioner $P = M^{-1}$ matrix may be difficult to compute. Moreover, for a non-quadratic cost function, the Hessian matrix changes every iteration. Another example of a benefit of approximating H instead of $H^{-1}$ is that it is possible to adjust the M matrix every iteration based on local Hessian approximation, while recomputing $P = M^{-1}$ every iteration may not be trivial unless M has a relatively simple form.

The implicit and explicit preconditioner also differ in the way the implicit and explicit preconditioner are applied. To apply the explicit preconditioner, only the matrix vector multiplication $d^{(n)} = P g^{(n)}$, needs to be computed, where $g^{(n)}$ and $d^{(n)}$ represent the gradient of the cost function and the update direction at $n^{th}$ iteration respectively. In the implicit preconditioner method, the preconditioned gradient direction $d^{(n)}$ is computed by solving an approximate cost function using iterative loops. Therefore, the algorithm using the implicit preconditioner is composed of nested iterative loops. The outer loop iterations can be a preconditioned gradient-based algorithm, in which the preconditioned gradient direction is supplied by the inner loop iterations. In each inner loop, we minimize an approximate cost function. We can rewrite the cost function of Equation 13 by $$f(x) = \|x - x^{(n)}\|_{A^t \Lambda A}^2 + x^t \Theta^{(n)} + \Phi(x) + c \qquad \text{Equation 14}$$

where $x^{(n)}$ is the image value at $n^{th}$ outer loop iteration, $\Theta^{(n)} = A^t \Lambda A (A x^{(n)} - u^{(j)} + n^{(j)})$, and $c$ is a constant.

By approximating $A^t \Lambda A$ with a matrix $M_1$, the approximate cost function is given by $$h^{(n)}(x) = \|x - x^{(n)}\|_{M_1}^2 + x^t \Theta^{(n)} + \Phi(x) + c \qquad \text{Equation 15}$$

Notice that the gradient of $h^{(n)}(x)$ and $f(x)$ equals at $x = x^{(n)}$. The regularization term in $h^{(n)}(x)$ is also calculated exactly. The only difference is in the approximation of $A^t \Lambda A$ with $M_1$. The minimization problem of $h^{(n)}$ is then solved iteratively by the inner loops. Let $\tilde{x}^{(n)}$ denote the solution of the inner loop. $\tilde{x}^{(n)}$ is not used directly as the image update. Instead, $\tilde{x}^{(n)}$ is used to compute the preconditioned gradient direction given by $d^{(n)} = \tilde{x}^{(n)} - x^{(n)}$. Any gradient-based algorithm can be used in the outer loop with the preconditioned gradient direction, such as, but not limited to, GD, CG, and/or the like.

Applying implicit preconditioner methods may be more expensive because the implicit preconditioner requires multiple iterations of the inner loop. However, the accurate approximation in the implicit preconditioner design might help speed up the overall convergence of the algorithm, and therefore justify the additional computational cost. Typically, in tomographic reconstruction problems, the most expensive computations are forward projection A and back projection $A^t$, which requires that the gradient of the cost function be computed at each iteration. Therefore, the inner loop computational cost might still be insignificant compared to the outer loop as long as an $M_1$ that is relatively fast to compute can be found.

A variety of choices for $M_1$ are possible. In one embodiment, $A^t A$ is approximated with a shift-invarient operator K. K can be constructed by sampling the $A^t A$ operator at the iso center. Notice that the proposed operator is a pure image space operator; and it is relatively easy to compute because it only requires filtering the image using FFTs. In the case where $\Lambda$ is not identity matrix, the Fessler and Rogers approximation to $A^t \Lambda A$ operator is used according to:

$$A^t \Lambda A \approx D A^t A D \qquad \text{Equation 16}$$

where D is a diagonal matrix, with the $i^{th}$ diagonal element given by $$d_i = \sqrt{\frac{\sum_j a_{ij}^2 \lambda_j}{\sum_j a_{ij}^2}}.$$

In another embodiment, $A^t A$ is not assumed to be shift-invariant. Instead, an approximation to $A^t A$ is found as a product of sparse matrices. One choice for $M_1$ is to precompute and store the $A^t A$ matrix. However, since $A^t A$ is not sparse, storing $A^t A$ may be unpractical. To solve this problem, a method has been proposed by Cao, Bouman and Webb to compute a sparse matrix representation for a non-sparse operator. The sparsified matrices are relatively small enough to be stored and are relatively easy to apply. More recently, a method has been proposed by Wei to compute relatively fast space-varying convolutions that could potentially be used to approximate the $A^t A$ operator.

In another embodiment, instead of approximating $A^t \Lambda A$ as a whole, the calculation of A itself can be simplified by using a simpler forward model, for example denoted by $\tilde{A}$. Examples of such simpler forward models include, but are not limited to, pixel driven forward and back projections, ray driven forward and back projections, and/or the like. The computation time of iterative reconstruction depends on the accuracy of the system model being used. More specifically, an accurate system model that incorporates the exact 3D scanning geometry, the effect of finite focal spot size, detector blurring, or other physical effects, increases computation time. Accordingly, various methods of simplification and approximations may be utilized to reduce computation time. For example, assuming an ideal line integral model, Siddon's method may be used to efficiently compute line integrals through a 3D pixel array with relatively compact computer code. In addition or alternatively, other simplified interpolation schemes may be used to make forward and back projection operators more computationally efficient.

In operation, there are various methods to construct $\tilde{A}$. For example, $\tilde{A}$ can be computed using a lower-resolution image grid of detectors. In the field of PET reconstruction, $\tilde{A}$ may be constructed by ignoring certain physical effects (positron range, crystal penetration, etc.), using a numerically more sparse system matrix, or configured based on texture mapping hardware on the GPU. One example for CT reconstruction is that the outer loop may compute $\tilde{A}$ using an accurate model, such as the Distance Driven model, while the inner loop is computed using Pixel Driven or Ray Driven models with coarse sampling in focal spot and detector cells. Another example is that the outer loop may compute $\tilde{A}$ using exact 3D cone beam geometry, while the inner loop $\tilde{A}$ is computed using a parallel or semi-parallel beam geometry using rebinned or re-sliced sinogram. $\tilde{A}$ may also be computed using data types with lower precision and faster computation than $\tilde{A}$. $\tilde{A}$ may also be computed using a Fast Fourier Transform (FFT) based technique. As used herein, in various embodiments, "fast" refers to faster computation than for the full original model A. For instance, "fast" can refer to a computational complexity on the order of $N^2 \log(N)$ instead of $N^3$ in 2D reconstruction or $N^3 \log(N)$ instead of $N^4$ in 3D reconstruction. These fast approaches may include, but are not limited to, a non-uniform FFT method, a pseudo-polar FFT method, an equisloped tomography method, a hierarchical method, and/or the like. $\tilde{A}$ may also be computed with lower resolution, but higher-order image basis functions from A. For example, instead of using rectangular voxels, $\tilde{A}$ may be computed using a piece-wise linear or higher-order parametric representation of voxels (for example, a z-slope voxel model or blobs).

Figure 5A:
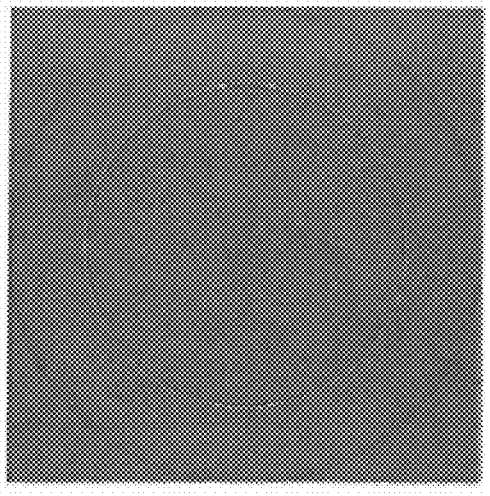
FIG. 5 is a visual representation of exemplary difference images.

FIG. 5 is a visual representation of exemplary difference images. FIG. 5 illustrates preliminary results of one example of the method 100. In the example of FIG. 5, the sub-problems were created according to Equation 10. The sub-problem of updating the image x was solved using the implicit preconditioner method. In the implicit preconditioner method, twenty iterations of a preconditioned conjugate gradient algorithm were used to solve the inner loop problem. Wires and resolution bars were used to test the spatial resolution of the reconstruction, and uniform region to measure the noise.

Figure 5B:
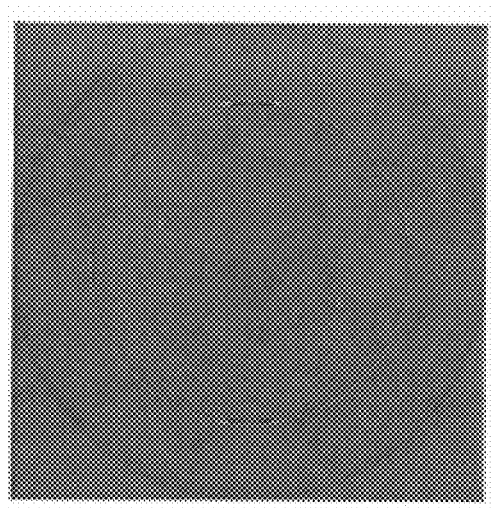
Figure 5C:
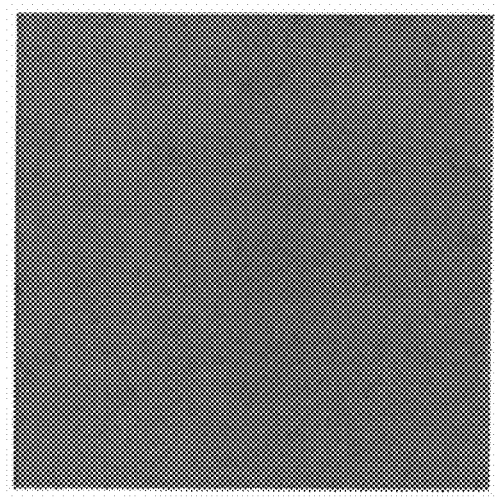

FIG. 5 compares the results of the example of the method 100 with a fully converged reference image using an ICD algorithm. The difference images of FIG. 5 are shown in a window between −100 to 100 Hounsfield units. In (a), FIG. 5 illustrates the difference image between the FBP image and the reference, in which the differences near the wire and the uniform region can be seen, which illustrates the difference in spatial resolution and noise, respectively. FIG. 5(b) shows the difference between the image of three iterations of the example of the method 100 and the reference, in which the differences are significantly reduced. After ten iterations, as shown in FIG. 5(c), the difference diminishes to the point that the difference is barely noticeable. The results qualitatively show that the method 100 converges to the solution within ten iterations.

The methods and algorithms described herein are used to reconstruct an image of an object. The methods and algorithms may be embodied as a set of instructions that are stored on a computer and implemented using, for example, a module 530, shown in FIG. 6, software, hardware, a combination thereof, and/or a tangible non-transitory computer readable medium. In one embodiment, a tangible non-transitory computer readable medium excludes signals.

Figure 6:
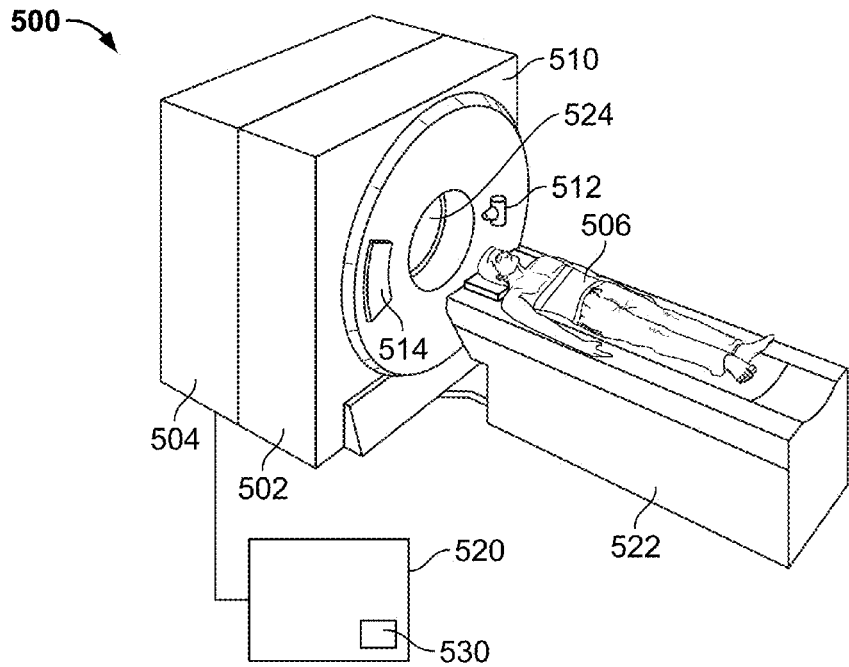
FIG. 6 is a pictorial view of an exemplary multi-modality imaging system formed in accordance with various embodiments.
Figure 7:
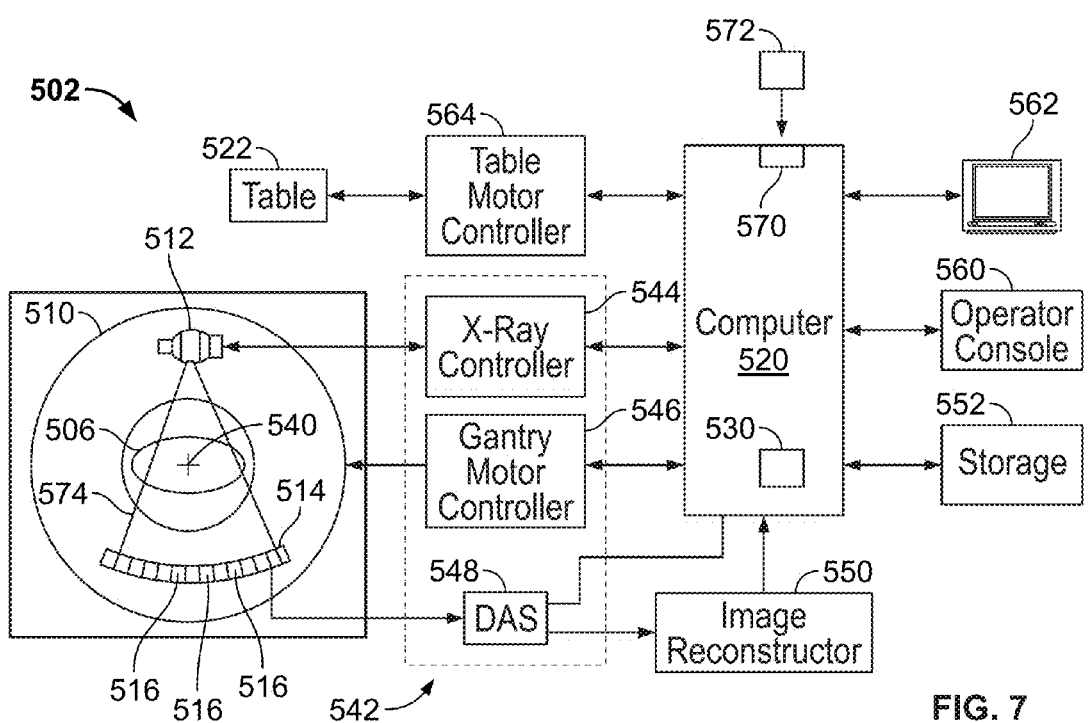
FIG. 7 is a block schematic diagram of the system illustrated in FIG. 6.

FIG. 6 is a pictorial view of an exemplary imaging system 500 that is formed in accordance with various embodiments. FIG. 7 is a block schematic diagram of a portion of the multi-modality imaging system 500 shown in FIG. 6. The imaging system may be embodied as a computed tomography (CT) imaging system, a positron emission tomography (PET) imaging system, a magnetic resonance imaging (MRI) system, an ultrasound imaging system, an x-ray imaging system, a single photon emission computed tomography (SPECT) imaging system, an interventional C-Arm tomography imaging system, a CT system for a dedicated purpose such as extremity or breast scanning, and combinations thereof, among others. In the exemplary embodiment, the method 100 is described with respect to a CT imaging system. Moreover, in the exemplary embodiment, the cost function is used to explain the various embodiments described herein.

Although various embodiments are described in the context of an exemplary dual modality imaging system that includes a computed tomography (CT) imaging system and a positron emission tomography (PET) imaging system, it should be understood that other imaging systems capable of performing the functions described herein are contemplated as being used.

The multi-modality imaging system 500 is illustrated, and includes a CT imaging system 502 and a PET imaging system 504. The imaging system 500 allows for multiple scans in different modalities to facilitate an increased diagnostic capability over single modality systems. In one embodiment, the exemplary multi-modality imaging system 500 is a CT/PET imaging system 500. Optionally, modalities other than CT and PET are employed with the imaging system 500. For example, the imaging system 500 may be a standalone CT imaging system, a standalone PET imaging system, a magnetic resonance imaging (MRI) system, an ultrasound imaging system, an x-ray imaging system, and/or a single photon emission computed tomography (SPECT) imaging system, interventional C-Arm tomography, CT systems for a dedicated purpose such as extremity or breast scanning, and combinations thereof, among others.

The CT imaging system 502 includes a gantry 510 that has an x-ray source 512 that projects a beam of x-rays toward a detector array 514 on the opposite side of the gantry 510. The detector array 514 includes a plurality of detector elements 516 that are arranged in rows and channels that together sense the projected x-rays that pass through an object, such as the subject 506. The imaging system 500 also includes a computer 520 that receives the projection data from the detector array 514 and processes the projection data to reconstruct an image of the subject 506. In operation, operator supplied commands and parameters are used by the computer 520 to provide control signals and information to reposition a motorized table 522. More specifically, the motorized table 522 is utilized to move the subject 506 into and out of the gantry 510. Particularly, the table 522 moves at least a portion of the subject 506 through a gantry opening 524 that extends through the gantry 510.

The imaging system 500 also includes a module 530 that is configured to implement various methods and algorithms described herein. The module 530 may be implemented as a piece of hardware that is installed in the computer 520. Optionally, the module 530 may be implemented as a set of instructions that are installed on the computer 520. The set of instructions may be stand alone programs, may be incorporated as subroutines in an operating system installed on the computer 520, may be functions in an installed software package on the computer 520, and the like. It should be understood that the various embodiments are not limited to the arrangements and instrumentality shown in the drawings.

As discussed above, the detector 514 includes a plurality of detector elements 516. Each detector element 516 produces an electrical signal, or output, that represents the intensity of an impinging x-ray beam and hence allows estimation of the attenuation of the beam as it passes through the subject 506. During a scan to acquire the x-ray projection data, the gantry 510 and the components mounted thereon rotate about a center of rotation 540. FIG. 7 shows only a single row of detector elements 516 (i.e., a detector row). However, the multislice detector array 514 includes a plurality of parallel detector rows of detector elements 516 such that projection data corresponding to a plurality of slices can be acquired simultaneously during a scan.

Rotation of the gantry 510 and the operation of the x-ray source 512 are governed by a control mechanism 542. The control mechanism 542 includes an x-ray controller 544 that provides power and timing signals to the x-ray source 512 and a gantry motor controller 546 that controls the rotational speed and position of the gantry 510. A data acquisition system (DAS) 548 in the control mechanism 542 samples analog data from detector elements 516 and converts the data to digital signals for subsequent processing. For example, the subsequent processing may include utilizing the module 530 to implement the various methods described herein. An image reconstructor 550 receives the sampled and digitized x-ray data from the DAS 548 and performs high-speed image reconstruction. The reconstructed images are input to the computer 520 that stores the image in a storage device 552. Optionally, the computer 520 may receive the sampled and digitized x-ray data from the DAS 548 and perform various methods described herein using the module 530. The computer 520 also receives commands and scanning parameters from an operator via a console 560 that has a keyboard. An associated visual display unit 562 allows the operator to observe the reconstructed image and other data from computer.

The operator supplied commands and parameters are used by the computer 520 to provide control signals and information to the DAS 548, the x-ray controller 544 and the gantry motor controller 546. In addition, the computer 520 operates a table motor controller 564 that controls the motorized table 522 to position the subject 506 in the gantry 510. Particularly, the table 522 moves at least a portion of the subject 506 through the gantry opening 524 as shown in FIG. 6.

Referring again to FIG. 7, in one embodiment, the computer 520 includes a device 570, for example, a floppy disk drive, CD-ROM drive, DVD drive, magnetic optical disk (MOD) device, or any other digital device including a network connecting device such as an Ethernet device for reading instructions and/or data from a computer-readable medium 572, such as a floppy disk, a CD-ROM, a DVD or an other digital source such as a network or the Internet, as well as yet to be developed digital means. In another embodiment, the computer 520 executes instructions stored in firmware (not shown). The computer 520 is programmed to perform functions described herein, and as used herein, the term computer is not limited to just those integrated circuits referred to in the art as computers, but broadly refers to computers, processors, microcontrollers, microcomputers, programmable logic controllers, application specific integrated circuits, and other programmable circuits, and these terms are used interchangeably herein.

In the exemplary embodiment, the x-ray source 512 and the detector array 514 are rotated with the gantry 510 within the imaging plane and around the subject 506 to be imaged such that the angle at which an x-ray beam 574 intersects the subject 506 constantly changes. A group of x-ray attenuation measurements, i.e., projection data, from the detector array 514 at one gantry angle is referred to as a "view". A "scan" of the subject 506 comprises a set of views made at different gantry angles, or view angles, during one revolution of the x-ray source 512 and the detector 514. In a CT scan, the projection data is processed to reconstruct an image that corresponds to a two dimensional slice taken through the subject 506.

Exemplary embodiments of a multi-modality imaging system are described above in detail. The multi-modality imaging system components illustrated are not limited to the specific embodiments described herein, but rather, components of each multi-modality imaging system may be utilized independently and separately from other components described herein. For example, the multi-modality imaging system components described above may also be used in combination with other imaging systems.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical drive, and/or the like. The storage device may also be other similar means for loading computer programs or other instructions into the computer or processor.

As used herein, the term "computer" may include any processor-based or microprocessor-based system including systems using microcontrollers, reduced instruction set computers (RISC), application specific integrated circuits (ASICs), logic circuits, GPUs, FPGAs, and any other circuit or processor capable of executing the functions described herein. The above examples are exemplary only, and are thus not intended to limit in any way the definition and/or meaning of the term "computer". The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments of the invention. The set of instructions may be in the form of a software program. The software may be in various forms such as system software or application software, which may be a non-transitory computer readable medium. Further, the software may be in the form of a collection of separate programs, a program module within a larger program or a portion of a program module. The software also may include modular programming in the form of object-oriented programming. The processing of input data by the processing machine may be in response to user commands, or in response to results of previous processing, or in response to a request made by another processing machine.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Also as used herein, the phrase "reconstructing an image" is not intended to exclude embodiments of the present invention in which data representing an image is generated, but a viewable image is not. Therefore, as used herein the term "image" broadly refers to both viewable images and data representing a viewable image. However, many embodiments generate, or are configured to generate, at least one viewable image.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting and are exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

This written description uses examples to disclose the various embodiments of the invention, including the best mode, and also to enable any person skilled in the art to practice the various embodiments of the invention, including making and using any devices or systems and performing any incorporated methods. The patentable scope of the various embodiments of the invention is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal languages of the claims.

What is claimed is:

1. A method for reconstructing an image of an object, the image including image elements, said method comprising:
   using a computer to perform:
   accessing measurement data associated with the image elements;
   introducing an auxiliary variable to transform an original problem of reconstructing the image to a constrained optimization problem, wherein the original problem comprises an objective function formulated at least in part based on measurement data and prior knowledge of the image representing the object, and wherein the auxiliary variable comprises an additional term that is not part of the original problem;
   solving the constrained optimization problem using a method of multipliers to create a sequence of sub-problems and solve the sequence of sub-problems, wherein solving the sequence of sub-problems comprises reconstructing the image by optimizing a first objective function, wherein the first objective function is optimized by iteratively solving a nested sequence of approximate optimization problems, and wherein an inner loop iteratively optimizes a second objective function approximating the first objective function, and an outer loop utilizes the solution of the second objective function to optimize the first objective function, and wherein solving the constrained optimization problem comprises updating the auxiliary variable.

2. The method of claim 1, wherein solving the constrained optimization problem using a method of multipliers to create a sequence of sub-problems and solve the sequence of sub-problems comprises solving the constrained optimization problem using an augmented Lagrangian (AL) method.

3. The method of claim 1, wherein introducing an auxiliary variable to transform an original problem of reconstructing the image to a constrained optimization problem comprises introducing the auxiliary variable into a data mismatch term of the first objective function, the auxiliary variable corresponding to a forward projection of the image, wherein the objective function has the form $f(x)=\{J(x, y)+\Phi(x)\}$, wherein x denotes the image, y denotes the measurement data, $J(x,y)$ is a data mismatch term that penalizes an inconsistency between the image and the measurement data, and $\Phi(x)$ is a regularization function that penalizes difference between adjacent elements in the image, and wherein the auxiliary variable is described by $u=Ax$, wherein u is the auxiliary variable.

4. The method of claim 3, wherein the image is updated using the auxiliary variable along with a weighting matrix that differs from an original statistical weighting matrix.

5. The method of claim 1, wherein introducing an auxiliary variable to transform an original problem of reconstructing the image to a constrained optimization problem comprises introducing the auxiliary variable into a regularization term of the first objective function, the auxiliary variable corresponding to a transform of the image.

6. The method of claim 1, wherein a Hessian matrix of each sub-problem is approximately shift invariant.

7. The method of claim 1, wherein solving the sequence of sub-problems comprises iteratively updating a reconstruction of the image, the auxiliary variable, and a transform of a Lagrangian multiplier.

8. The method of claim 1, wherein solving the sequence of sub-problems comprises iteratively updating a reconstruction of the image, the auxiliary variable, and a transform of a Lagrangian multiplier, wherein the auxiliary variable and the transform of the Lagrangian multiplier have closed form solutions and the reconstruction of the image is solved iteratively.

9. The method of claim 1, wherein for the outer loop, each iteration formulates an approximate objective function and the inner loop optimizes the approximate objective function iteratively.

10. The method of claim 1, wherein the second objective function of the inner loop is constructed by approximating a Hessian matrix of a data mismatch term of the first objective function using an approximation matrix.

11. The method of claim 10, wherein the approximation matrix is a combination of a sequence of sparse or shift-invariant matrices.

12. The method of claim 10, wherein an A operator and an A' operator of the approximation matrix are approximated based on at least one of a simplified forward and back projector, a low resolution forward and back projector, rebinned data, or Fourier based methods.

13. A non-transitory computer readable medium being programmed to instruct a computer to:
   access measurement data associated with image elements;
   create a sequence of sub-problems from an original problem of reconstructing an image of an object, the sub-problems including a reconstruction of the image, an auxiliary variable, and a transform of a Lagrangian multiplier;
   update the reconstruction of the image and the auxiliary variable; and
   update the transform of the Lagrangian multiplier using the updated reconstruction of the image and the updated auxiliary variable; and
   iteratively update the reconstruction of the image using the updated auxiliary variable and the updated transform of the Lagrangian multiplier.

14. The non-transitory computer readable medium of claim 13, wherein the computer is instructed to iteratively update the reconstruction of the image using the updated auxiliary variable and the updated transform of the Lagrangian multiplier by optimizing a first objective function, wherein the first objective function is optimized by iteratively solving a nested sequence of approximate optimization problems, and wherein an inner loop iteratively optimizes a second objective function approximating the first objective function, and an outer loop utilizes the solution of the second objective function to optimize the first objective function.

15. The non-transitory computer readable medium of claim 13, wherein the computer is instructed to update the reconstruction of the image and the auxiliary variable by alternatively updating the reconstruction of the image and the auxiliary variable.

16. The non-transitory computer readable medium of claim 13, wherein the auxiliary variable and the transform of the Lagrangian multiplier have closed form solutions.

17. The non-transitory computer readable medium of claim 13, wherein the computer is further instructed to introduce the auxiliary variable into a data mismatch term of an objective function, the auxiliary variable corresponding to the forward projection of the image.

18. The non-transitory computer readable medium of claim 13, wherein the computer is further instructed to introduce the auxiliary variable into a regularization term of an objective function, the auxiliary variable corresponding to a transform of the image.

19. The non-transitory computer readable medium of claim 13, wherein a Hessian matrix of each sub-problem is approximately shift-invariant.

20. An imaging system comprising:
a detector array; and
a computer coupled to the detector array, the computer configured to:
access measurement data associated with image elements;
introduce an auxiliary variable to transform an original problem of reconstructing an image of an object to a constrained optimization problem, wherein the original problem comprises an objective function formulated at least in part based on measurement data and prior knowledge of the image representing the object, and wherein the auxiliary variable comprises an additional term that is not part of the original problem;
solve the constrained optimization problem using a method of multipliers to create a sequence of sub-problems and solve the sequence of sub-problems, wherein solving the sequence of sub-problems includes reconstructing the image by optimizing a first objective function, wherein the first objective function is optimized by iteratively solving a nested sequence of approximate optimization problems, and wherein an inner loop iteratively optimizes a second objective function approximating the first objective function, and an outer loop utilizes the solution of the second objective function to optimize the first objective function, and wherein solving the constrained optimization problem comprises updating the auxiliary variable.

21. The system of claim 20, wherein the computer is configured to solve the constrained optimization problem using the method of multipliers by solving the constrained optimization problem using an augmented Lagrangian (AL) method.

22. The system of claim 20, wherein for the outer loop, each iteration formulates an approximate objective function and the inner loop optimizes the approximate objective function iteratively.

* * * * *